US010897041B2

(12) United States Patent
Hintennach

(10) Patent No.: US 10,897,041 B2
(45) Date of Patent: Jan. 19, 2021

(54) ELECTRODE, ELECTROCHEMICAL ENERGY ACCUMULATOR WITH AN ELECTRODE, AND METHOD FOR PRODUCING AN ELECTRODE

(71) Applicant: Daimler AG, Stuttgart (DE)

(72) Inventor: Andreas Hintennach, Freiberg (DE)

(73) Assignee: Daimler AG, Stuttgart (DE)

( * ) Notice: Subject to any disclaimer, the term of this patent is extended or adjusted under 35 U.S.C. 154(b) by 114 days.

(21) Appl. No.: 16/319,150

(22) PCT Filed: Jul. 6, 2017

(86) PCT No.: PCT/EP2017/000801
§ 371 (c)(1),
(2) Date: Jan. 18, 2019

(87) PCT Pub. No.: WO2018/014997
PCT Pub. Date: Jan. 25, 2018

(65) Prior Publication Data
US 2020/0243843 A1    Jul. 30, 2020

(51) Int. Cl.
*H01M 4/136* (2010.01)
*H01M 4/04* (2006.01)
(Continued)

(52) U.S. Cl.
CPC ............ *H01M 4/136* (2013.01); *H01M 4/04* (2013.01); *H01M 4/045* (2013.01); *H01M 4/0426* (2013.01); *H01M 4/0428* (2013.01); *H01M 4/1397* (2013.01); *H01M 4/5815* (2013.01); *H01M 4/625* (2013.01); *H01M 10/05* (2013.01); *H01M 10/052* (2013.01)

(58) Field of Classification Search
CPC ...... H01M 4/136; H01M 4/04; H01M 4/0426; H01M 4/0428; H01M 4/045; H01M 4/1397; H01M 4/5815; H01M 4/625; H01M 10/052; Y02E 60/10
See application file for complete search history.

(56) References Cited

U.S. PATENT DOCUMENTS

| 6,878,488 B2 | 4/2005 | Gorkovenko et al. |
| 2015/0056507 A1 | 2/2015 | Dadheech et al. |
| (Continued) | | |

FOREIGN PATENT DOCUMENTS

| DE | 10 2013 222 145 A | 4/2015 |
| DE | 10 2013 226 011 A1 | 6/2015 |
| (Continued) | | |

OTHER PUBLICATIONS

EPO website (www.espacenet.com) machine translation of JP2014-067632A (Year: 2014).*
(Continued)

*Primary Examiner* — Gregg Cantelmo
(74) *Attorney, Agent, or Firm* — Crowell & Moring LLP

(57) ABSTRACT

An electrode for an electrochemical energy accumulator includes a catalyst layer, where the catalyst layer includes an electrically conductive matrix and a chemically active material which is intercalated into the electrically conductive matrix. A protective coating is disposed on the catalyst layer, where the protective coating includes at least one metal oxide and methionine.

8 Claims, 1 Drawing Sheet

(51) Int. Cl.
  *H01M 4/1397*    (2010.01)
  *H01M 4/58*      (2010.01)
  *H01M 4/62*      (2006.01)
  *H01M 10/052*    (2010.01)
  *H01M 10/05*     (2010.01)

(56) References Cited

U.S. PATENT DOCUMENTS

2015/0180000 A1* 6/2015 Roumi ............... H01M 10/48
                                                    429/50
2016/0093589 A1  3/2016 Sato et al.
2016/0164103 A1  6/2016 Son et al.
2016/0190561 A1  6/2016 Son et al.

FOREIGN PATENT DOCUMENTS

| DE | 11 2014 003 358 T5 | 4/2016 |
|---|---|---|
| JP | 2002-237304 A | 8/2002 |
| JP | 2005-347608 A | 12/2005 |
| JP | 2014-67632 A | 4/2014 |
| JP | 2015-201270 A | 11/2015 |
| JP | 2015-210960 A | 11/2015 |
| KR | 10-2010-0013673 A | 2/2010 |
| WO | WO 01/04973 A1 | 1/2001 |

OTHER PUBLICATIONS

Japanese Office Action issued in Japanese counterpart application No. 2019-502678 dated Nov. 19, 2019, with partial English translation (Eight (8) pages).
PCT/EP2017/000801, International Search Report dated Sep. 19, 2017 (Two (2) pages).
German Office Action issued in German counterpart application No. 10 2016 008 918.0 dated May 4, 2017 (Five (5) pages).

* cited by examiner

ELECTRODE, ELECTROCHEMICAL ENERGY ACCUMULATOR WITH AN ELECTRODE, AND METHOD FOR PRODUCING AN ELECTRODE

BACKGROUND AND SUMMARY OF THE INVENTION

The invention relates to an electrode for an electrochemical energy accumulator. The invention also relates to an electrochemical energy accumulator with such an electrode. Furthermore, the invention relates to a method of producing such an electrode.

Electrodes for electrochemical energy accumulators are known from the related art. For example, DE 11 2014 003 358 T5 describes a positive electrode for a lithium-sulfur battery, comprising particles of sulfur-based active material and a carbon coating, encapsulating the particles of sulfur-based active material. Also, the positive electrode comprising a structural coating formed on a surface of the carbon coating. The structural coating is selected from the group consisting of a structural coating of a metal oxide composite material, a structural coating of a mixed carbon and metal oxide composite material, and a polymer structural coating.

Furthermore, DE 10 2013 222 145 A1 describes a lithium-sulfur battery comprising a solid lithium-containing anode and a sulfur-compound containing cathode with a metal oxide coating.

It is an object of the invention to indicate an electrode which is better than the related art, an improved electrochemical energy accumulator and a suitable method of producing such an electrode.

An electrode for an electrochemical energy accumulator having an active material layer, comprising an electrically conductive matrix and a chemically active material intercalated into the electrically conductive matrix. The electrically conductive matrix, for example, is a porous and mechanically flexible carbon structure. Graphite or carbon black, for example, each having good electrical conductivity, is used for this purpose. As a chemically active material, such as sulfur, is intercalated into the electrically conductive matrix. The term chemically active material refers to a material which is oxidized or reduced during electrode operation, especially during operation of an electrochemical energy accumulator comprising the electrode.

According to the invention, it is intended that the active material layer is provided with a protective coating comprising at least one metal oxide and methionine.

By means of the protective coating, the chemically active material is protected from being released from the electrically conductive matrix. The release of the chemically active material from the electrically conductive matrix can take place during a discharge process of the electrochemical energy accumulator, wherein short-chain and/or long-chain polycompounds, in particular polysulfides, of the chemically active material, which may not have been completely elementalized during a preceding charging process, e.g., to elemental sulfur, emerging from the active material layer and migrating via an electrolyte to a counter electrode. At the counter-electrode, the polycompounds react with a chemically active material of the counter-electrode, e.g., lithium, to form a layer that significantly reduces the capacity and therefore the lifetime of the electrochemical energy accumulator. In addition, the chemically active material embedded in the electrically conductive matrix of the electrode is successively degraded and the risk of a short circuit between the electrode and the counter electrode increases significantly.

The protective coating comprising methionine and at least one metal oxide is only permeable to certain ions, such as lithium ions, but not to polycompounds of the chemically active material of the electrode, such as polysulfide. This ensures that only a chemically active material, e.g., lithium, of a counter electrode interacting with the electrode can pass through the protective coating and that the chemically active material of the electrode remains in the active material layer of the electrode.

Methionine, also known as 2-amino-4-methylmercapto-butyric acid, is a sulfur-containing, proteinogenic amino acid and, due to its particularly good chemical stability, is suitable for use in the electrode as part of the protective coating. The at least one metal oxide, e.g., aluminum oxide, is an oxygen compound of a metallic element, e.g., aluminum, and has electrically insulating properties. At least one metal oxide is ion-selective and permeable to certain ions, such as lithium ions. This is made possible by specifying a pore size of less than 2 micrometers with a layer thickness of more than 3.5 micrometers. Furthermore, the metal oxide is chemically stable against an electrolyte, which is arranged between the electrode and the counter electrode as a transfer medium for the chemically active material of the counter electrode. Due to the semi-permeability of the protective coating, the electrolyte at least partially penetrates it. Since both methionine and the metal oxide are largely chemically stable under the influence of the electrolyte, a function of the protective coating is retained during operation of the electrochemical energy accumulator.

Preferably, the protective coating is designed in such a manner that it completely encloses the active material layer. Therefore, the protective coating offers complete protection against the chemically active material being released from the electrically conductive matrix. The protective coating can also enclose a substrate on which the active material layer is applied.

According to a design example, the protective coating is two-layered and comprises a methionine layer containing the methionine and a metal oxide layer containing at least one metal oxide. The formation of the protective coating with two separate layers enables optimum protection of the active material layer against the chemically active material being released from the electrically conductive matrix, due to the chemical stability of both layers. Also, a layer thickness of the metal oxide layer compared to the related art can be reduced, by means of the methionine layer, so that the electrically insulating properties of the metal oxide layer can be limited and the negative effects of too large a layer thickness, such as reduced reduction and oxidation processes, can be reduced.

Preferably, the methionine layer is deposited on the active material layer and thereby forms a lower or inner layer, which is directly arranged on a surface of the active material layer. The metal oxide layer is deposited on the methionine layer and forms an upper or outer layer. The two layers are interconnected in the form of an in-situ composite so that at least one bordering area of the layers is (in situ) cross-linked.

The metal oxide layer is preferably formed as an aluminum oxide layer. An aluminum oxide contained in this layer is, for example, in the form of nanoparticles. Aluminum oxide is characterized in particular by rapid liquid absorption, high porosity, good mechanical strength and a very low tendency to shrink under thermal stress.

An electrochemical energy accumulator is still provided, comprising at least one electrode in accordance to the invention as described above or a design example of the electrode and at least one counter electrode. For example, the at least one electrode is a cathode and the at least one counter electrode is an anode. The electrochemical energy accumulator is formed either as a single cell for a group of cells or as a group of cells with a plurality of single cells. For example, the electrochemical energy accumulator is formed as a lithium-sulfur cell in which lithium is used as the active material for the cathode sulfur and for the anode lithium. Alternatively, the electrochemical energy accumulator can also be formed as another metal-sulfur cell, e.g., as a sodium-sulfur cell.

The electrochemical energy accumulator is improved compared to conventional electrochemical energy accumulators, since the protective coating prevents, or at least reduces, the detachment of the chemically active material from the active material layer of the electrode. This enables an increased lifetime of the electrochemical energy accumulator in an advantageous manner.

In a method of producing an electrode in accordance to the invention, as mentioned above or an example of the electrode, a chemically active material is intercalated into an electrically conductive matrix to form an active material layer of the electrode and the active material layer is provided with a protective coating, comprising at least one metal oxide and methionine.

By means of this method, it is possible to improve the quality of the electrode compared to conventional electrodes, in which the amount of chemically active material remains constant over a longer period of time compared to conventional electrodes. An energy accumulator, comprising the electrode can therefore be optimized with regard to service life and function.

In a design example, the following steps are carried out to produce the electrode. In a first step, the active material layer is applied to a substrate. Furthermore, methionine is provided in powder form and a methionine layer is formed by depositing the powdered methionine on the active material layer. Further, a metal-containing precursor compound and a counter compound are provided. The metal oxide layer is then formed by depositing at least one layer of the metal-containing precursor compound on the methionine layer and subsequently applying the counter component to the deposited metal-containing precursor compound.

The deposition of the methionine layer as well as the deposition of the metal oxide layer takes place at temperatures below a melting temperature of the chemically active material of the electrode. The deposition of methionine takes place at room temperature, i.e., at a temperature of approx. 25° C. To deposit the methionine layer, the powdery methionine is distributed as evenly as possible on the active material layer. The deposition is performed, for example, by means of electrostatic deposition or powder deposition. The deposition of the metal oxide layer is performed, such as atomic layer deposition at a temperature between 80° C. and 100° C. This temperature is below a melting temperature of sulfur, which is 127° C. Thereby, in the case of a sulfur-containing electrode, the sulfur intercalated in the active material layer is not attacked during deposition.

An absolute pore size as well as a distribution of the pores and an absolute layer thickness of the protective coating can be specified individually.

In the following, design examples of the invention will be explained in more detail using drawings.

DETAILED DESCRIPTION OF THE DRAWINGS

Parts corresponding to each other are provided in all Figures with the same reference signs.

Figure 1:
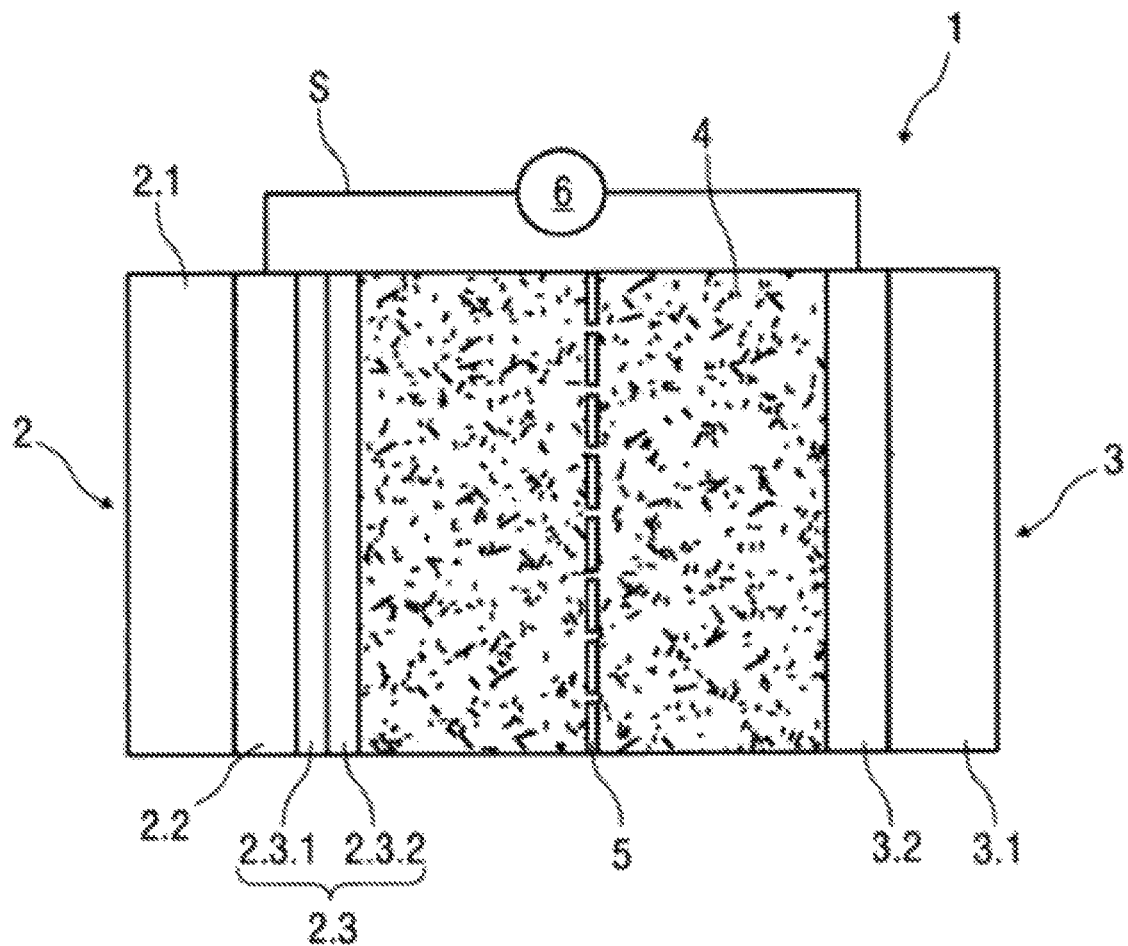
FIG. 1 schematically shows a sectional view of a design example of an electrochemical energy accumulator with an electrode and a counter electrode.

FIG. 1 shows schematically a longitudinal section of an electrochemical energy accumulator 1, which is formed, for example, as a single cell for a rechargeable battery. e.g., a lithium-sulfur battery.

The electrochemical energy accumulator 1, comprising an electrode 2 and a counter electrode 3, wherein the electrode 2 is formed as a cathode and the counter electrode 3 is formed as an anode. An ion-conducting electrolyte 4 is arranged between electrode 2 and counter electrode 3. Furthermore, an ion-conducting separator 5 is arranged between the electrode 2 and the counter electrode 3.

The electrode 2 comprising a substrate 2.1, is provided with a coated active material layer 2.2. The substrate 2.1 is formed by an electrically insulating material, comprising, for example, polycarbonate. The active material layer 2.2 is formed by a composite material, comprising an electrically conductive matrix and a chemically active material.

The electrically conductive matrix is formed by an electrically conductive, porous and mechanically flexible carbon structure, e.g., graphite or carbon black. The chemically active material, comprising sulfur compounds, especially sulfur, is intercalated into the electrically conductive matrix.

The counter electrode 3 also comprising a substrate 3.1, for example, polycarbonate, which is provided with an active material layer 3.2. The active material layer 3.2 is also formed as a composite material, comprising an electrically conductive matrix and a chemically active material. The electrically conductive matrix for the counter electrode 3, for example, consists of an electrically conductive carbon structure and a silicon structure. The chemically active material herein is lithium or a lithium alloy.

The electrolyte 4 comprising a liquid, non-aqueous electrolyte solution which contains, for example, a non-aqueous solvent and a lithium salt dissolved therein. The separator 5, for example, is formed as a semi-permeable membrane, permeable in particular to ions, which is formed, for example, by a microporous ceramic, a microporous polymeric film or a microporous glass fiber fleece.

The chemically active materials of the electrode 2 and counter electrode 3 can be integrated homogeneously over the entire electrode 2 or counter electrode 3 into their electrically conductive matrices. The chemically active materials are used for a chemical reaction between the electrode 2 and counter electrode 3, especially during charging and discharging of the electrochemical energy accumulator 1, as described in more detail below using the example of a lithium-sulfur battery.

When the electrochemical energy accumulator 1 is discharged, the energy stored in the counter electrode 3 intercalated lithium is oxidized into lithium ions and electrons. The lithium ions migrate through electrolyte 4 to the electrode 2, while at the same time the electrons are transferred via an external circuit S from the counter electrode 3 to electrode 2. An energy consumer 6 is arranged in the outer circuit S, which is supplied with energy by the electron current. In the electrode 2, the lithium ions are absorbed by a reduction reaction in which the sulfur is reduced to lithium-sulfide. The electrochemical reaction, when discharging the electrochemical energy accumulator 1 can be described as follows:

Counter electrode 3: $Li \rightarrow Li^+ + e^-$ and

Electrode 2: 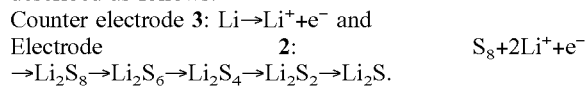 $S_8 + 2Li^+ + e^- \rightarrow Li_2S_8 \rightarrow Li_2S_6 \rightarrow Li_2S_4 \rightarrow Li_2S_2 \rightarrow Li_2S$.

When charging the electrochemical energy accumulator 1, an energy source (not shown) is connected to the electrode 2 and the counter electrode 3. In the electrode 2, lithium from lithium-sulfide is oxidized into lithium cations and electrons, whereby the lithium cations migrate via the electrolyte 4 and the electrons via the outer circuit S back to the counter electrode 3.

The storage of the chemically active material, i.e., lithium ions, for example, during the charging process of the electrochemical energy accumulator 1, as well as the retrieval of the chemically active material during the discharge of the electrochemical energy accumulator 1 leading to very strong volumetric changes of the electrode 2 and the counter electrode 3. This is also called "breathing" of the electrode 2 or the counter electrode 3.

When discharging the electrochemical energy accumulator 1, short-chain polysulfides, e.g., Li2S2, and/or long-chain polysulfides, e.g., Li2S8, Li2S6, which may not have been fully formed into elemental sulfur in the electrode 2, diffuse out from the active material layer 2.2 of the electrode 2 and migrate via the electrolyte 4 to the counter electrode 3, as this electrode in the electrolyte 4 is not soluble. At the counter electrode 3, a lithium-sulfide layer can be formed by means of the polysulfides, significantly reducing the service life of the electrochemical energy accumulator 1. Additionally, the chemically active material embedded in the electrically conductive matrix of electrode 2 is successively degraded and the risk of a short circuit between electrode 2 and counter electrode 3 increases significantly.

To prevent the chemically active material from dissolving out of the electrode 2 or at least reduce it, the active material layer 2.2 shall be provided with a protective coating 2.3, which is described below in more detail.

The protective coating 2.3 is preferably formed in two parts, comprising a methionine layer 2.3.1 containing methionine and a metal oxide layer 2.3.2 containing at least one metal oxide. The methionine layer 2.3.1 is directly on the active material layer 2.2 and therefore forms a lower or inner layer of the protective coating 2.3.

The methionine contained in the methionine layer 2.3.1 is a sulfurous, proteinogenic amino acid, also known as 2-amino-4-methylmercaptobutyric acid, and due to its excellent chemical stability, it is suitable for use in electrode 2 as part of the protective coating 2.3.

The metal oxide layer 2.3.2 is deposited on the methionine layer 2.3.1 and forms an upper or outer layer of the protective coating 2.3. For example, the metal oxide layer 2.3.2 formed as aluminum oxide layer. The metal oxide layer 2.3.2 is an oxygen compound of a metal and has electrically insulating properties. Further, the metal oxide layer 2.3.2 is ion-selective and permeable to ions of the counter electrode 3, e.g., lithium ions. This is made possible by specifying a pore size for the metal oxide layer 2.3.2 of less than 2 micrometers and a layer thickness of more than 3.5 micrometers. Also, the metal oxide layer 2.3.2 is chemically stable compared to the electrolyte 4. This is particularly advantageous because, due to the semi-permeability of the metal oxide layer 2.3.2, the electrolyte 4 penetrates at least partially into the metal oxide layer 2.3.2 and into the methionine layer 2.3.1.

Both the methionine layer 2.3.1 and the metal oxide layer 2.3.2 are permeable to the chemically active material of the counter electrode 3, but impermeable to the chemically active material of the electrode 2. In particular, the methionine layer 2.3.1 and the metal oxide layer 2.3.2 are impermeable to polysulfide compounds.

At a boundary surface between the methionine layer 2.3.1 and the metal oxide layer 2.3.2 they are cross-linked with each other, so that the methionine layer 2.3.1 and the metal oxide layer 2.3.2 are connected with each other in the form of a so-called in-situ composite.

Figure 2:
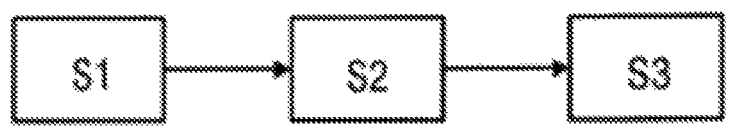
FIG. 2 schematically shows an exemplary operation of a method for the production of an electrode for an electrochemical energy accumulator.

FIG. 2 shows an exemplary operation of a method for the production of electrode 2 described in FIG. 1.

In a first step S1, the active material layer 2.2 is applied to the substrate 2.1. The active material layer 2.2 can be applied to the substrate 2.1, e.g., by means of sputter coating or atomic layer deposition.

In a second step S2, the methionine layer 2.3.1 is deposited on the active material layer 2.2. Also, methionine powder is distributed as evenly as possible on the active material layer 2.2, and deposited, for example, by means of electrostatic deposition. Here, the methionine is electrically charged, e.g., by means of high voltage or friction, and then transferred to the active material layer 2.2. A distribution of the methionine on the active material layer 2.2 is preferably applied by means of a uniform distribution of finely divided crystals on the surface of the active material layer 2.2. The active material layer 2.2 can additionally be charged with an electrical potential to improve the electrostatic adhesion of the methionine to the active material layer 2.2. Alternatively, the formation of the methionine layer 2.3.1 can also be controlled by means of powder coating. A homogeneous formation of the methionine layer 2.3.1 is not absolutely necessary, since the methionine layer 2.3.1 is partially detached from the active material layer 2.2 under a later influence of the electrolyte 4. A temperature during the deposition of methionine corresponds to a room temperature of about 25° C.

In a third step S3, the metal oxide layer 2.3.2 is formed on the methionine layer 2.3.1. This is done, for example, by means of atomic layer deposition. First, a metal-containing precursor compound and a counter compound are provided. The metal oxide layer 2.3.2 is then formed by means of depositing at least one layer of the metal-containing precursor compound on the methionine layer 2.3.1 and then applying the counter-component to the deposited metal-containing precursor compound.

Using the particular example of a deposition of aluminum oxide, for example trimethylaluminum can be used as a metal-containing precursor compound which is used in presence of water as a counter compound. For deposition, trimethylaluminum is introduced into a reaction chamber in which electrode 2 is also located. After a specified time, an excess of precursor molecules is removed by pumps to prevent an unwanted chemical reaction at a later point in time. Afterwards, water vapor, for example, is introduced into the reaction chamber as a counter compound, which reacts with the trimethylaluminum to become aluminum oxide. Excess water and any reaction products are then also removed by means of pumps.

The deposition of the metal oxide layer 2.3.2 is performed at a temperature between 80° C. and 100° C. and is therefore below a melting temperature of sulfur, which is above 127° C. The sulfur intercalated in the electrically conductive matrix of the active material layer 2.2 is thereby not affected during deposition.

With the electrode 2 produced in this manner, dissolution of the sulfur intercalated in the electrically conductive matrix is reduced, preferably avoided, even at high temperatures. If sulfur is nevertheless dissolved out of the active material layer 2.2 in the event of an unscheduled reaction or if the temperature is exceeded for a short time, it remains electrically contacted and can be stored again in the electrically conductive matrix in later charging cycles.

The invention claimed is:

1. An electrode for an electrochemical energy accumulator, comprising:
    an active material layer, wherein the active material layer comprises:
    an electrically conductive matrix; and
    a chemically active material which is intercalated into the electrically conductive matrix; and
    a protective coating disposed on the active material layer, wherein the protective coating comprises at least one metal oxide and methionine;
    wherein the protective coating is formed in two layers including a methionine layer containing the methionine and a metal oxide layer containing the at least one metal oxide.

2. The electrode according to claim 1, wherein the protective coating completely encloses the catalyst active material layer.

3. The electrode according to claim 1, wherein the methionine layer is deposited on the catalyst active material layer.

4. The electrode according to claim 1, wherein the metal oxide layer is deposited on the methionine layer.

5. The electrode according to claim 1, wherein the metal oxide layer is an aluminum oxide layer.

6. An electrochemical energy accumulator, comprising:
    an electrode according to claim 1;
    a counter electrode; and
    an electrolyte disposed between the electrode and the counter electrode.

7. The electrochemical energy accumulator according to claim 6, wherein the electrode is a cathode and wherein the counter electrode is an anode.

8. A method for producing the electrode according to claim 1, comprising the steps of:
    intercalating the chemically active material into the electrically conductive matrix to form the active material layer;
    disposing the protective coating on the active material layer;
    applying the active material layer to a substrate;
    providing of the methionine in powder form;
    providing a metal-containing precursor compound and a counter compound;
    forming a methionine layer by depositing the powder methionine on the active material layer; and
    forming a metal oxide layer by depositing at least one layer of the metal-containing precursor compound on the methionine layer and thereafter applying the counter compound to the deposited metal-containing precursor compound.

* * * * *